United States Patent [19]

Rosenberg

[11] Patent Number: 5,019,774

[45] Date of Patent: May 28, 1991

[54] METHOD AND APPARATUS FOR SENSING THE ROTATIONAL SPEED OF AN AIRCRAFT WHEEL WITH AN AMPLIFIER AND TRANSDUCER LOCATED IN THE WHEEL AND A CIRCUIT TO CHECK THE INTEGRITY OF THE TRANSDUCER

[75] Inventor: Jerome C. Rosenberg, Bellevue, Wash.

[73] Assignee: The Boeing Company, Seattle, Wash.

[21] Appl. No.: 228,977

[22] Filed: Aug. 5, 1988

[51] Int. Cl.$^5$ .......................... G01P 3/48; G01P 3/54; G01B 7/14; B60T 8/70

[52] U.S. Cl. .............................. 324/174; 324/207.25; 303/106; 244/111

[58] Field of Search ................ 324/173, 174, 207, 208; 310/155, 168, 171; 330/1 R; 303/97, 106; 244/111

[56] References Cited

U.S. PATENT DOCUMENTS

| | | |
|---|---|---|
| 2,799,462 | 7/1957 | Steigerwald . |
| 2,838,657 | 6/1958 | Wilcox . |
| 3,017,145 | 1/1962 | Yarber . |
| 3,060,602 | 10/1962 | Buttenhoff . |
| 3,233,946 | 2/1966 | Lockhart . |
| 3,302,110 | 1/1967 | Hopengarten . |
| 3,455,162 | 7/1969 | Michener et al. .................. 324/173 |
| 3,600,679 | 8/1971 | Hill . |
| 3,608,979 | 9/1971 | Coyle . |
| 3,609,395 | 9/1971 | Jania . |
| 3,669,508 | 6/1972 | Attri . |
| 3,739,211 | 6/1973 | Hasler .................................. 310/168 |
| 3,816,766 | 6/1974 | Anselmo et al. ..................... 307/309 |
| 3,942,112 | 3/1976 | Westbrook .......................... 324/166 |
| 4,083,423 | 4/1978 | Williams et al. . |
| 4,231,331 | 11/1980 | Suzuki et al. ....................... 324/166 |
| 4,269,455 | 5/1981 | Beck et al. . |
| 4,327,948 | 5/1982 | Beck et al. . |

Primary Examiner—Walter E. Snow
Attorney, Agent, or Firm—Seed and Berry

[57] ABSTRACT

An amplifier circuit is placed in the wheel assembly of the landing gear of an aircraft. The amplifier circuit amplifies a signal whose frequency is proportional to the speed of the wheel prior to transmitting the signal over a transmission line to sensing and control circuits. This permits a high frequency signal to be generated at the wheel assembly and insures that the signal has sufficient power to be sensed by a remotely located sensing circuit even though the signal may be attenuated by the capacitance in the transmission line. This permits a higher frequency signal to be generated than previously possible. This provides greater wheel speed resolution and enhanced sensitivity for aircraft landing gear antiskid systems.

20 Claims, 2 Drawing Sheets

METHOD AND APPARATUS FOR SENSING THE ROTATIONAL SPEED OF AN AIRCRAFT WHEEL WITH AN AMPLIFIER AND TRANSDUCER LOCATED IN THE WHEEL AND A CIRCUIT TO CHECK THE INTEGRITY OF THE TRANSDUCER

DESCRIPTION

1. Field of the Invention

This invention relates to antiskid systems and more particularly to circuits for sensing accurately the rotational speed of a wheel to which a brake is being applied.

2. Background of the Invention

Accurately sensing and transmitting a wheel rotational speed is an important element of an antiskid control system because a rapidly decreasing wheel speed indicates that the wheel is about to enter a skid condition. The brake pressure applied to the wheel must then quickly be released to prevent the wheel from skidding. It is particularly important that skidding of the wheels on a landing gear be prevented while landing an aircraft. In the event a wheel begins to skid during landing, the tire will quickly be destroyed which may result in the aircraft crashing at high speeds into structures located on the ground.

Prior art systems for preventing the wheel of an aircraft landing gear from entering a skid condition include wheel rotational speed sensors. These systems include a signal generator in which a signal is generated at the wheel having a frequency that is proportional to the rotational speed of the wheel. The signal is transmitted from each wheel to respective sensing and control circuits. The control circuits appropriately control the braking pressure to prevent skidding of the respective wheels.

The signal transmission lines from the wheel speed signal generator to the sensing and control circuit are in the range of 50-100 feet in length for most commercial aircraft. Such transmission lines contain significant capacitive loading. As the frequency of the wheel speed signal increases, the signal loss, due to the capacitive loading in the transmission line, increases. At high frequencies, corresponding to high rotational speeds, the attenuation of the signal, due to capacitive loading in the transmission line, becomes so great that the wheel rotational speed cannot be properly sensed to permit accurate antiskid control.

One of the solutions proposed by the prior art is to limit the maximum frequency generated by the wheel rotational speed circuit. This has the disadvantage that the wheel speed cannot be as precisely sensed. A lowering of wheel speed resolution results in a reduction in antiskid system performance and thus, brake performance.

SUMMARY OF THE INVENTION

It is an object of this invention to provide a wheel speed signal generation circuit which amplifies the generated signal at the wheel prior to transmitting it to the sensing and control circuit.

It is another object of this invention to provide a wheel speed signal generation circuit having an amplified signal in which only two wires are coupled between the wheel assembly and the sensing and control circuit.

It is a further object of this invention to provide a method of amplifying a signal near the signal generation source using a power supply located at a remote location.

These and other objects of the invention are accomplished by generating a signal indicative of a wheel rotational speed using an amplifying circuit located within the wheel assembly. After the signal is amplified, it is transmitted to sensing and control circuits at a remote location. The sensing and control circuits control the braking force to prevent the wheel from entering a skid condition.

A power supply for the amplifying circuit is located at a remote location. The power supply is coupled to one of the signal transmission lines. This permits only two wires to be used to amplify and transmit the signal from the wheel assembly to the remote sensing and control circuit. Use of a two wire transmission line provides significant weight and cost savings. Amplifying the signal prior to transmission permits a higher frequency signal to be generated and transmitted without undue loss when transmitted to a remote location. Use of a higher frequency signal results in more precise sensing of the wheel rotational speed.

DETAILED DESCRIPTION OF THE INVENTION

Figure 1:
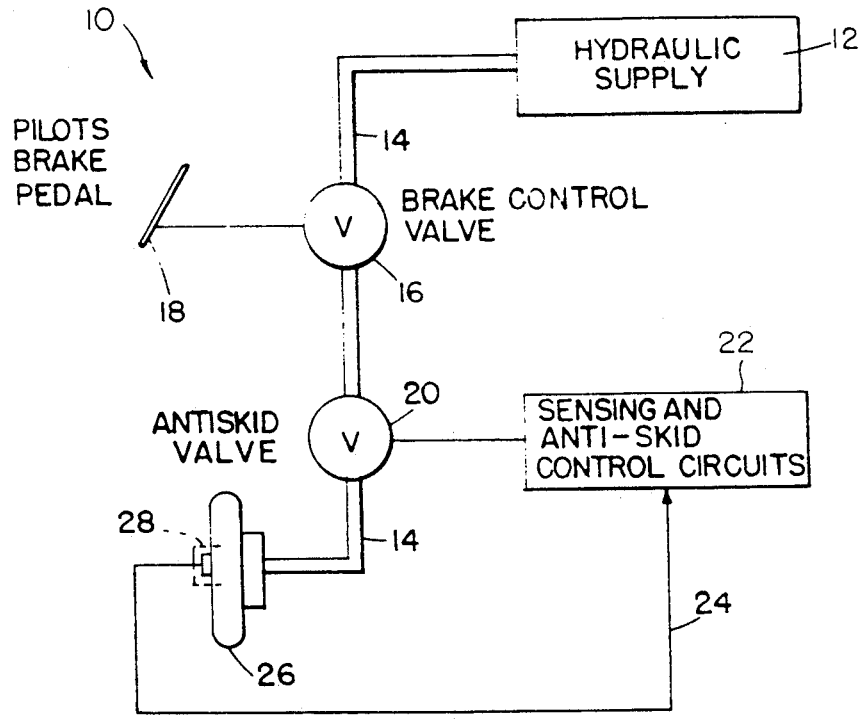
FIG. 1 is a block diagram of the antiskid system of the present invention.

An aircraft landing gear brake and antiskid system is designated, generally at 10, as shown in FIG. 1. All commercial aircraft, such as a Boeing 747, 737 or the like, include such systems. The system includes a hydraulic supply 12 and a hydraulic line 14 coupling the hydraulic supply to the respective wheels of the landing gear. A brake control valve 16 is coupled in the hydraulic supply line. Through brake pedal 18, the pilot directly controls the position of valve 16, which controls the braking pressure applied to the individual wheels. The hydraulic supply is of very high pressure, usually 3000 psi, and therefore provides significant braking power.

An electric signal corresponding to the rotational speed of wheel 26 is generated by transducer assembly 28 and transmitted along line 24 to sensing and antiskid control circuits 22. An antiskid valve 20 is coupled in the hydraulic line 14 behind the valve 16. In the event the wheel begins to enter the skid condition, the control circuit 22 controls valve 20 to reduce the braking pressure to prevent the wheel from entering a skid condition. An antiskid system similar to that illustrated in FIG. 1 is provided for each individual wheel in the aircraft landing gear.

Figure 2:
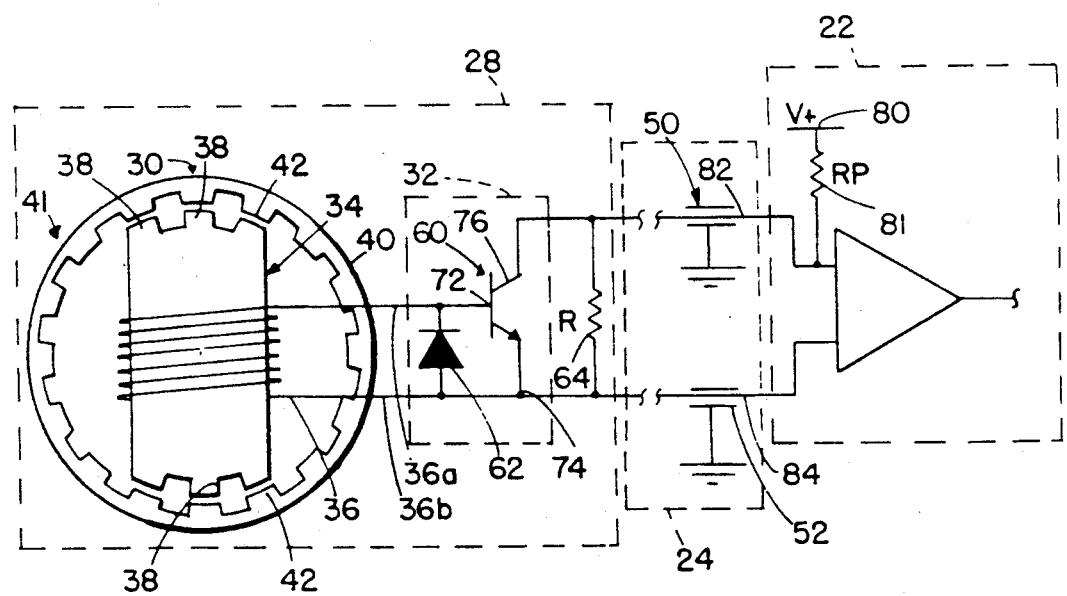
FIG. 2 is a schematic diagram of the wheel rotational speed sensor and amplifier.
Figure 3:
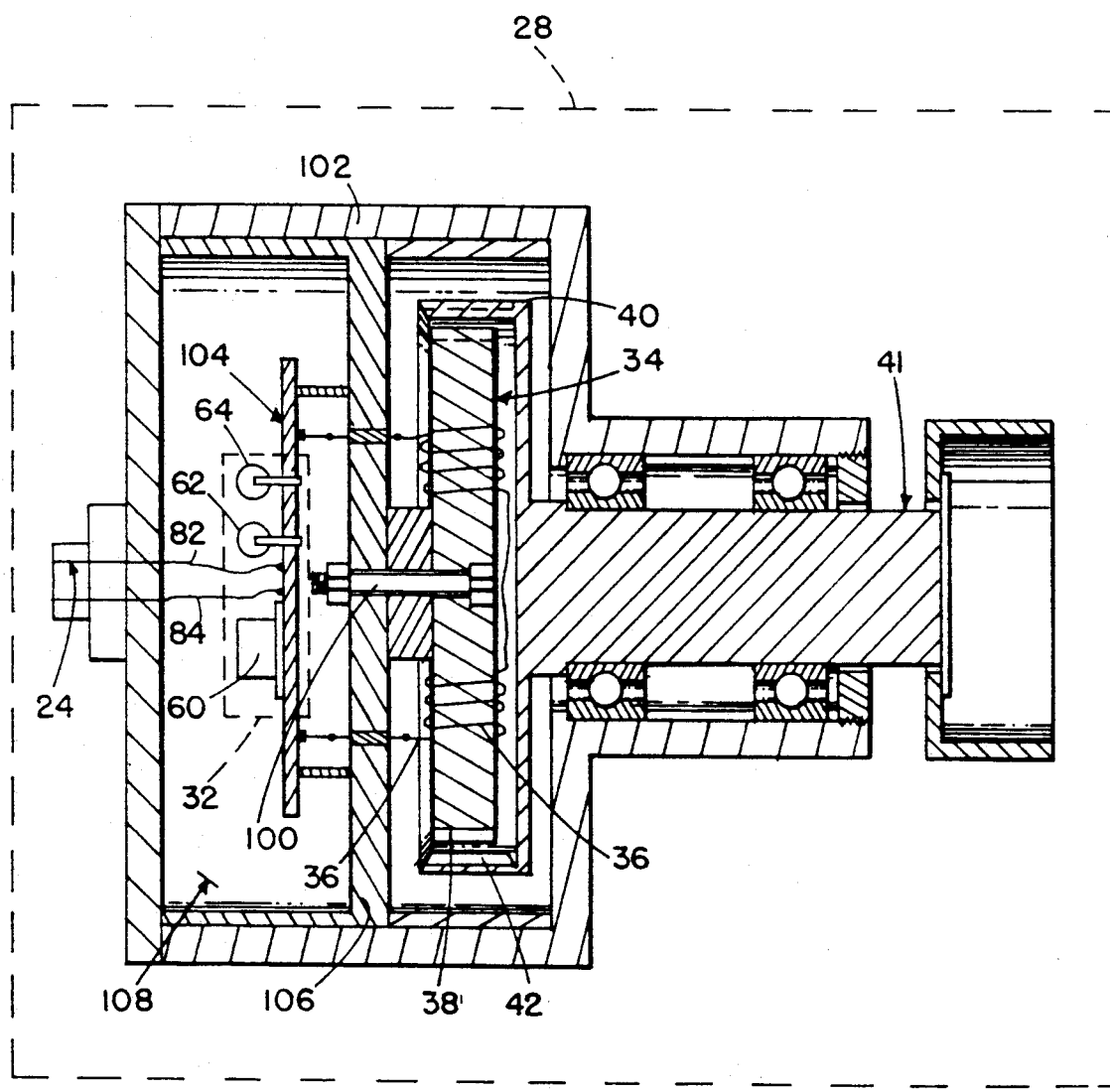
FIG. 3 is a cross-sectional view of a wheel assembly having the amplifier circuit mounted therein.

As shown in FIG. 2, the wheel speed signal generation assembly 28 includes a transducer assembly 30. The transducer assembly 30 includes a magnet 34 and a conductive wire 36 wrapped around the magnet 34. The magnet 34 includes a plurality of teeth 38. The magnet 34 is preferably a permanent magnet but may be an electromagnet. A shaft assembly 41 includes an enlarged end 40, having a plurality of teeth 42, as shown in FIG. 3. The rotational speed of the shaft end 40 having teeth 42 is proportional to the wheel 26's rotational speed.

The wheel speed transducer operates as follows. The magnet 34, having electrically conductive wire 36 wrapped there around, is held stationary. As the wheel 26 rotates, the shaft 40, including end 41, rotates, moving teeth 42 past teeth 38 of magnet 34. As the shaft teeth 42 move past the magnet teeth 38, an electrical signal is generated within wire 36. The generated electrical signal generally approximates a sin wave, having a frequency that is proportional to the rotational speed of shaft 41. The frequency of the signal generated at a given rotational speed is proportional to the number of teeth 38 and 42. If there are many teeth, the signal frequency will be relatively high for a given rotational speed, and if there are few teeth, the signal frequency will be relatively low for the same rotational speed. As the shaft 41 increases in speed, the frequency of the signal generated on wire 36 increases.

Wheel speed transducer assemblies, similar to transducer 30 just described, are used in the prior art. In the prior art assemblies, the signal generated on line 36 is directly coupled by lines 36a and 36b to transmission line 24, which transfers the signal to the remotely located sensing and antiskid control circuits 22. The length of transmission line 24 from the wheel transducer assembly 30 to the electronic circuits 22 is often in the range of 50 to 100 feet. Because the transmission line is so long, the capacitive loading, represented by capacitors 50 and 52 in transmission line 24, is significant. Present transmission lines are twisted, shielded lines. This twisting and shielding of the lines prevents interference from creating spurious signals or noise on the transmission line.

Despite the use of twisted, shielded transmission lines the capacitance of the line is significant. Signal loss due to the transmission line capacitance can be calculated as follows. The current through capacitors 50 and 52 in the transmission lines, assuming the capacitance is constant, is given by the fundamental capacitor equation:

$$i = C \frac{dv}{dt} \quad (1)$$

Where i is the current flow in wire 36, and $$\frac{dv}{dt}$$

is the derivative of the voltage, with respect to time.

The voltage generated by the transducer assembly 30 is a sin wave having an amplitude of a and frequency of $\omega$. The generated signal may be expressed by the following equation:

$$V_g = a(\sin\omega t) \quad (2)$$

where $V_g$ is the generated voltage, a is the magnitude of the voltage and w is the frequency of the sin wave.

Substituting the voltage generated, as given by Equation 2, into Equation 1 yields the current flow through the capacitor as follows:

$$i = C \frac{d[a(\sin\omega t)]}{dt} \quad (3)$$

The derivative of a sin wave is given by the equation:

$$d(\sin x) = \cos x \, dx \quad (4)$$

taking a derivative of the voltage of Equation 3 yields:

$$i = \omega C a (\cos \omega t) \quad (5)$$

As can be seen by viewing Equation 5, the current through the capacitors 50 and 52 is a function of both the capacitance in the line and the signal frequency. Current through capacitors 50 and 52 results in signal loss. The capacitance in transmission line 24 is made as small as possible in order to minimize the current lost through the capacitors 50 and 52. When the wheels are rotating extremely fast, such as right after a landing, the frequency $\omega$ is relatively high. Even for a transmission line 24 having a very small capacitance, as $\omega$ becomes large, the current loss through capacitors 50 and 52 increases significantly, resulting in the attenuation of the signal. When the signal is greatly attenuated the sensing circuit cannot determine the wheel speed. Because the antiskid system prevents skids based on changes in wheel speed, loss of the signal at any time, particularly at high speeds, prevents the antiskid system from operating properly.

Because the capacitance has already been minimized, the prior art systems prevent loss of the signal by keeping the highest frequency that can be generated by the transducer assembly 30, very low. The frequency is kept relatively low by reducing the number of teeth 42 and 38 on the shaft 40 and magnet 34 respectively. With relatively few teeth, the generated frequency can be kept below the frequency at which significant current is lost through the line capacitance. In current systems, the number of teeth on the rotor is in the range of 50–200, depending on the airplane, transmission line length, etc. The maximum number of teeth which can currently be placed on the rotor is 200, because excess signal is lost if more teeth are present. The size and spacing of teeth on the magnet are similar to the size and spacing of the teeth on the rotor. While minimizing the number of teeth 38 and 42 keeps the frequency low to aid in preventing signal loss, one disadvantage of this approach is that the wheel speed can not be as precisely determined. If the maximum frequency is restricted to a low value, the resolution between different wheel speeds is more difficult. The sensitivity of the antiskid control system is, therefore, decreased and the performance of the braking system is reduced.

According to the invention, an amplifying circuit 32 is placed within the wheel assembly 28 to amplify the signal prior to transmitting the signal over transmission line 24. The amplification of the signal prior to transmission permits a relatively high current to be lost through the capacitors 50 and 52, while still providing sufficient voltage to the sensing circuit 22 to permit the circuit to determine the wheel speed. The advantage provided by this approach is that the frequency of the voltage generated by transducer assembly 30 may be significantly increased. This permits greater resolution of the exact wheel speed and greater sensitivity to changes in wheel speeds. Further, the operator can be assured that the signal has sufficient strength that sensing circuit 22 will always be able to accurately sense the wheel speed, even at very high rotational speeds.

One embodiment of the amplification circuit 32 includes a transistor 60. One end of the output wire 36a, from the pick-up wire 36 is coupled to the base 72 of transistor 60. The other end, 36b of the wire 36, is coupled to the emitter 74 of transistor 60. A supply voltage 80, capable of supplying the power for amplification, is coupled at a remote location to collector 76 of transistor 60. A gain control resistor 81, Rp, is connected between the voltage source 80 and the transmission line 82. A diode 62 is coupled between lines 36a and 36b to protect the transistor base-emitter junction. The transistor 60, in conjunction with diode 62, outputs a signal having the same frequency as the signal generated by transducer assembly 30, but having significantly more power, as determined by the gain of the amplifier circuit voltage source 80 and gain resistor 81. The amount of amplification provided by the transistor 60 can be determined by the selection of the voltage supply source 80 and the resistor 82, as is well known in the art. The same voltage source 80 may be used to provide the amplification power to each of the respective circuits 32 of each of the wheel assemblies if desired.

Amplification circuit 32 may be any amplification circuit which provides the additional power to the signal. For example, two or more transistors may be used to create a signal which is not inverted or has a desired wave shape. Further, the voltage source 80 may be a negative voltage supply coupled to the transmission line which is coupled to the emitter. Many different known transistors may be used, including a different bipolar transistor; or an MOS transistor, MISFET, MOSFET, etc., which have their gates coupled in the circuit in place of the base and their respective source/drains in place of the emitter and collector.

The amplifying circuit 32 is selected and designed to withstand the temperatures and harsh operating environment existing in wheel assembly 28. Further, the amplifying circuit 32 must provide sufficient amplification and power output to boost the signal the required amount to permit it to be transmitted over transmission line 24 and received at the control circuit 22, even though the signal will be attenuated, due to current loss through capacitors 50 and 52, as previously described herein.

Amplifier circuit 32 receives the needed power from voltage source 80 and provides the signal output on transmission line 24, using only two lines, 82 and 84. The voltage source 80 is coupled to one of two transmission lines, 82, which is a part of line 24. The voltage source 80 may be enclosed within antiskid control circuit 22 or separately located, if desired.

Resistor 64 has a relatively high resistance of known and unchanging value. The resistor 64 provides a safety check to ensure that the circuit is properly connected. A bleed current is placed on line 82 by a power supply (not shown) at certain times and the voltage drop across lines 82 and line 84 is measured. If the voltage drop is exactly the expected value, according to Ohms law, this indicates that there are no breaks in the transmission line. However, if there is no drop, this indicates that there is an open circuit or broken line somewhere in the system. If the voltage drop is zero, this indicates there is a short somewhere in the system. Voltage drops other than expected also indicate a possible malfunction in the system which may be examined in more detail and diagnosed. Resistor 64 and associated power supply permit the integrity of the transmission lines, as well as transistor 60, to be verified repeatedly, as desired, to ensure that the system is operating properly, just prior to or after each landing.

The use of only two lines to both apply power to the amplifier circuit and transmit the amplified signal from the wheel assembly 28 to the sensing and control circuits 22 results in significant cost savings. The transmission line 24 is a specially shielded and twisted line to minimize the capacitance 50 and 52. Further, the line must be properly shielded to insure that external noise does not affect the reading of the signal. For example, during aircraft landings when the invention will be in use, radio signals transmitted by numerous sources, including the radio-control tower, the aircraft which is landing and numerous other aircraft in the area, may interfere with the signal if it is not properly shielded. The signal, even when amplified, is relatively small compared to other electrical signals. The shielding of transmission line 24 results in it being relatively heavy. The addition of a third or fourth wire extending between transducer 30 and circuits 22 would add significant weight to the aircraft, particularly for an aircraft such as a Boeing 747 having 16 individual landing wheels. The use of only two wires, while providing a strong signal, results in significant cost savings over the life of the aircraft.

This invention permits the transducer assembly and shaft end 40 to generate a signal having a frequency ranging from zero to a very high frequency. As many as 700 to 1000 teeth may be placed on the shaft end 40, if desired. The spacing of teeth on the magnet is such that 700 to 1000 teeth would also be on the magnet if it were a full disk, but because the magnet 34 is only a fraction of a full disk, fewer teeth are on the magnet than the 700-1000 teeth that are on the shaft end 40. The frequency of the signal generated can therefore be 5 to 20 times greater than the greatest possible frequency of the prior art systems. This provides increased resolution which results in significantly better antiskid performance than possible in the prior art. The signal is amplified prior to being transmitted over transmission line 24. This ensures that the signal received at remote sensing circuit 22 has sufficient power, even at the highest frequencies that the wheel speed is sensed. This provides the advantage that the wheel speed is more precisely sensed and the antiskid circuit is more sensitive to changes in wheel speed. Skid conditions can thus be more easily prevented than is possible with conventional systems.

The particular circuit shown in FIG. 2 further has the advantage that it is light in weight and withstands the harsh environment, including high operating temperatures near wheel 26. The physical embodiment of the circuit diagram of FIG. 2 is illustrated in FIG. 3. The signal generation assembly 28 includes a shaft assembly 41 having an enlarged end 40 having teeth 42 as previously described herein. The magnet 34 having teeth 38 and wire 36 is rigidly mounted to interior member 106 by bolt 100. Alternatively, the magnet may be mounted on shaft 41 to rotate past fixed teeth. Other known techniques or transducers may be used to generate the signal on wire 36 whose frequency is dependent on the rotational speed of shaft 41.

The amplification circuit 32 is mounted to circuit board 104 which is coupled to member 106. The amplification circuit 32 includes transistor 60 and diode 62, as previously described. System test resistor 64 is also mounted on board 104. The output of the amplifier circuit 32 is coupled by circuit board 104 to transmission line 24 having individual lines 84 and 82, as previously described and shown in FIG. 2. The transmission line 24 extends from the wheel assembly 28 to the remotely-located sensing and antiskid control circuits 22 as shown in FIG. 1. A potting compound 108 encloses the amplifier circuit 32 to protect it from the harsh environment and repeated landings and takeoffs.

The transducer assembly 30 and amplifier circuit 32 are coupled in housing 102 to a single member 106 as shown in FIG. 3. This provides ease in manufacture, replacement and repair. The entire transducer assembly 28, including the shaft end 40, magnet 34 and amplifier circuit 32 may be inserted into the wheel axles of currently existing aircraft. Transmission lines 24, already existing, may be appropriately connected. Voltage supply 80 may be coupled appropriately at the remote location, either within circuits 22 or separately located. This also permits easy repair and replacement of the invention after it has been installed in an aircraft.

Either just the magnet 34, or just the shaft end 40 may have a relatively large number of teeth thereon, if desired. Alternatively, both may have a relatively large number of teeth thereon, as has been described. The magnet 34 has been shown and described as a stator located inside the shaft end 40, which is the rotor; however, their locations or respective functions may be reversed with the magnet being a stator placed around the outside of the shaft end 40, which is the rotor. Alternatively, the magnet may also be the rotor, coupled to the shaft and another element or magnet used as the stator, if desired.

While this invention has been described with respect to a specific embodiment and alternatives thereof, other alternatives which are equivalent may be substituted by those of ordinary skill in the art and still fall within the scope of this invention.

I claim:

1. An apparatus for sensing a rotational speed of a wheel of an aircraft landing gear during landing, comprising:
   a transducer means located adjacent said wheel for producing a signal having a frequency proportional to said wheel's rotational speed;
   an amplifying circuit means located adjacent said wheel for amplifying said signal, said amplifying circuit means including a transistor having a collector and an emitter;
   a sensing circuit means located remotely from said amplifying circuit for receiving said signal and sensing wheel speed;
   a two-wire transmission line means extending from said amplifying circuit to said sensing circuit for transmitting said signal from said amplifying circuit to said sensing circuit;
   a power supply means located remotely from said wheel for providing power to said amplifying circuit, said power supply being coupled to said transmission line to provide power to said amplifying circuit along said transmission line;
   a resistor coupled between said collector and said emitter, said collector being coupled to said power supply means and said emitter being coupled to ground, said power supply means placing a voltage across said resistor to check the integrity of said apparatus.

2. The apparatus according to claim 1 wherein said amplifying circuit includes a diode.

3. The apparatus according to claim 2 wherein an anode of said diode is electrically coupled a base of said transistor.

4. The apparatus according to claim 1 wherein said transducer assembly includes a wire within a magnetic field having one end thereof electrically coupled to a base of said transistor and an other end thereof electrically coupled to said emitter of said transistor.

5. The apparatus according to claim 1 wherein said transducer includes a rotor, said rotor having more than 700 teeth thereon.

6. The apparatus according to claim 1 wherein said transducer assembly includes a wire with an magnetic field.

7. The apparatus according to claim 6, further including a member having said wire and said amplifying circuit attached thereto.

8. The apparatus according to claim 1 wherein said power supply is located within said sensing circuit.

9. The apparatus according to claim 1 wherein said power supply includes a gain resistor disposed at a location remote from said wheel.

10. The apparatus according to claim 1 wherein said transducer includes a stator and the number of teeth on said stator exceeds 700.

11. An apparatus for sensing the rotational speed of a wheel on the landing gear of an aircraft, comprising:
    a wheel assembly positioned on the landing gear of an aircraft;
    a magnet located within said wheel assembly and having a plurality of teeth;
    a shaft located within said wheel assembly and coupled to said wheel, said shaft having a rotational speed proportional to a rotational speed of said wheel;
    a plurality of shaft teeth located within said wheel assembly and coupled to said shaft, said shaft teeth disposed adjacent said teeth of said magnet;
    a signal amplifying circuit located within said wheel assembly;
    a signal generation wire located with said wheel assembly and within said magnet's magnetic field to generate a signal having a frequency corresponding to the rotational speed of said shaft as said shaft teeth move past said magnet, said generation wire being coupled to said amplifying circuit;
    a sensing circuit located remotely from said wheel assembly;
    a two-wire signal transmission line coupled between said amplifying circuit and said remotely located sensing circuit, significant capacitive loading being present on said transmission line, said signal being transmitted on said transmission line; and
    a power source means remotely located from said wheel assembly and electrically coupled to said transmission line for providing power to said amplifying circuit along said transmission line to amplify said signal generated by said signal generation wire to ensure adequate sensing by said remotely located sensing circuit at all frequencies of said signal.

12. The apparatus according to claim 11 wherein the number of transistors in said signal amplifying circuit is one.

13. The apparatus according to claim 11 wherein the number of transistors in said amplifying circuit is three or less.

14. The apparatus according to claim 11 wherein said amplifying circuit includes a transistor having a collector and an emitter;
    a resistor positioned within said wheel assembly coupled between said collector and said emitter, said collector being coupled to said power supply means and said emitter being coupled to ground, said power supply means placing a voltage across said resistor to check the integrity of said apparatus.

15. The apparatus according to claim 11, further including a gain resistor means for determining the gain of said amplifying circuit, said gain resistor being disposed at a remote location.

16. The apparatus according to claim 11 wherein the number of teeth on said shaft exceeds 700 for generating a higher frequency signal for a given shaft rotational speed than would be generated by a shaft having fewer teeth and rotating at the same given speed.

17. An apparatus for sensing a rotational speed of a wheel, comprising:
   a wheel assembly housing including a rotatable shaft having teeth coupled thereto, said shaft rotation speed being in proportion to said wheel rotational speed;
   a pickup assembly means having teeth, for generating a signal having a frequency proportional to the wheel rotational speed, said pickup assembly means being located within said housing;
   a signal amplifying means for amplifying said generated signal, located within said wheel assembly housing and coupled to said pickup assembly;
   a sensing means for sensing said signal coupled to said signal amplifying means disposed remote from said amplifying means,
   a two-wire signal transmission line coupled between said amplifying means and said sensing means;
   a first power supply means for providing power to said amplifying means, said power supply being remotely located from said wheel housing, said power supply being coupled to said transmission line for providing power to said amplifying means along said transmission line;
   a resistor positioned within said wheel assembly housing, a first terminal of said resistor being connected to one of said transmission lines and a second terminal of said resistor being coupled to the other of said transmission lines; and
   a second power supply means for selectively placing a voltage across said resistor to check the integrity of said apparatus.

18. The apparatus according to claim 17 wherein said pickup assembly means includes a magnet.

19. The apparatus according to claim 17 wherein said rotatable shaft and said pickup assembly means each have a large number of teeth, respectively.

20. The method of sensing the rotational speed of a wheel of an aircraft during a landing, comprising:
   generating a signal whose frequency is proportional to said wheel rotational speed;
   amplifying said signal in an amplifying circuit positioned adjacent said wheel;
   transmitting said signal to a sensing circuit at a location remote from said wheel;
   electrically coupling a power supply to said amplifying circuit for amplifying said signal, said power supply being at a location remote from said wheel;
   coupling a first resistor to said amplifying circuit at a location adjacent said wheel;
   coupling a second resistor between said power supply and said first resistor, said first and second resistors being in series; and
   sensing the voltage across said first resistor for testing the integrity of said amplifying circuit.

* * * * *